March 1, 1949.    L. C. GOODWIN    2,463,099
MEAT SLICING MACHINE
Filed May 8, 1946    2 Sheets-Sheet 1
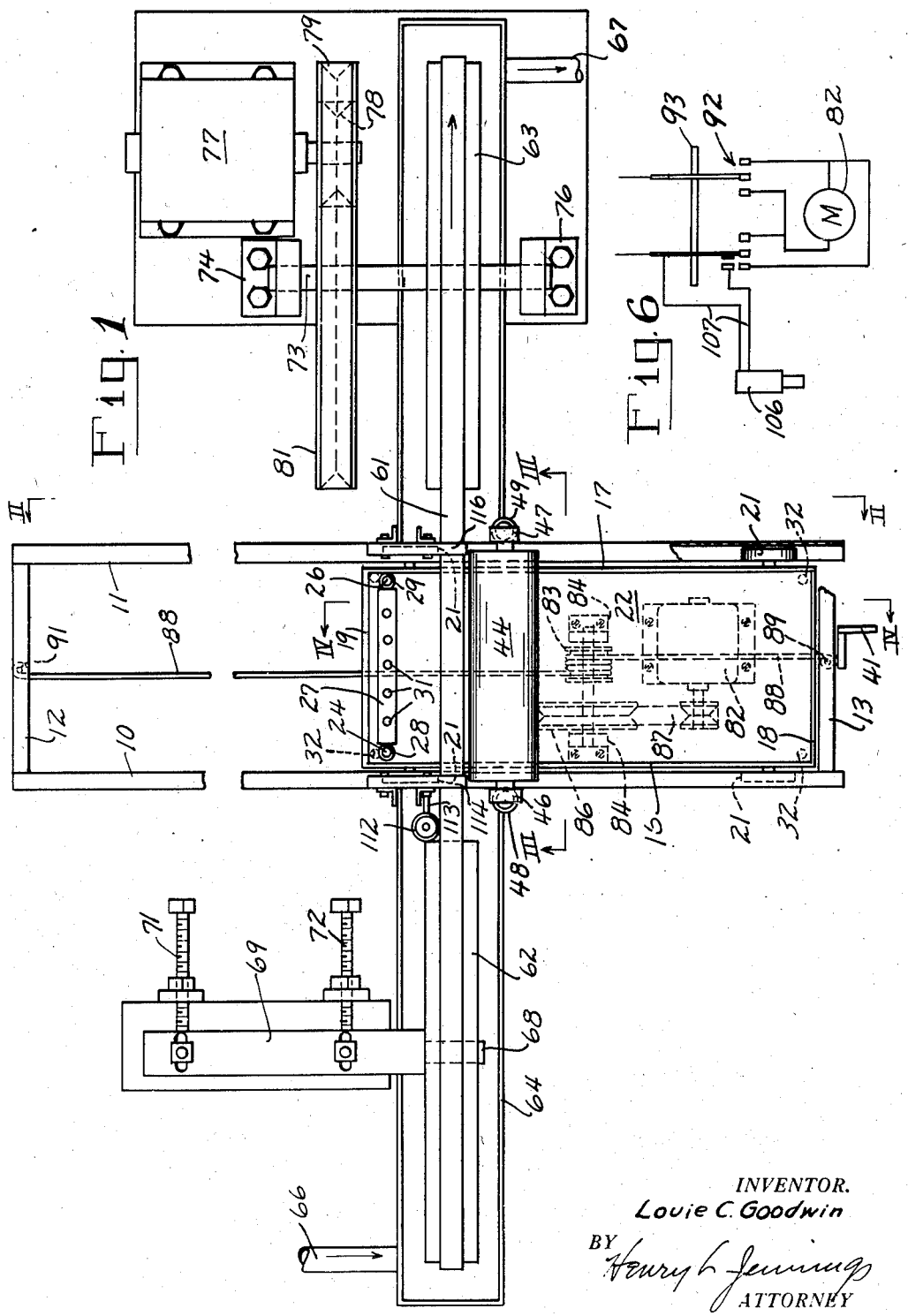
INVENTOR.
Louie C. Goodwin
BY Henry L. Jennings
ATTORNEY March 1, 1949.  L. C. GOODWIN  2,463,099
MEAT SLICING MACHINE
Filed May 8, 1946  2 Sheets-Sheet 2
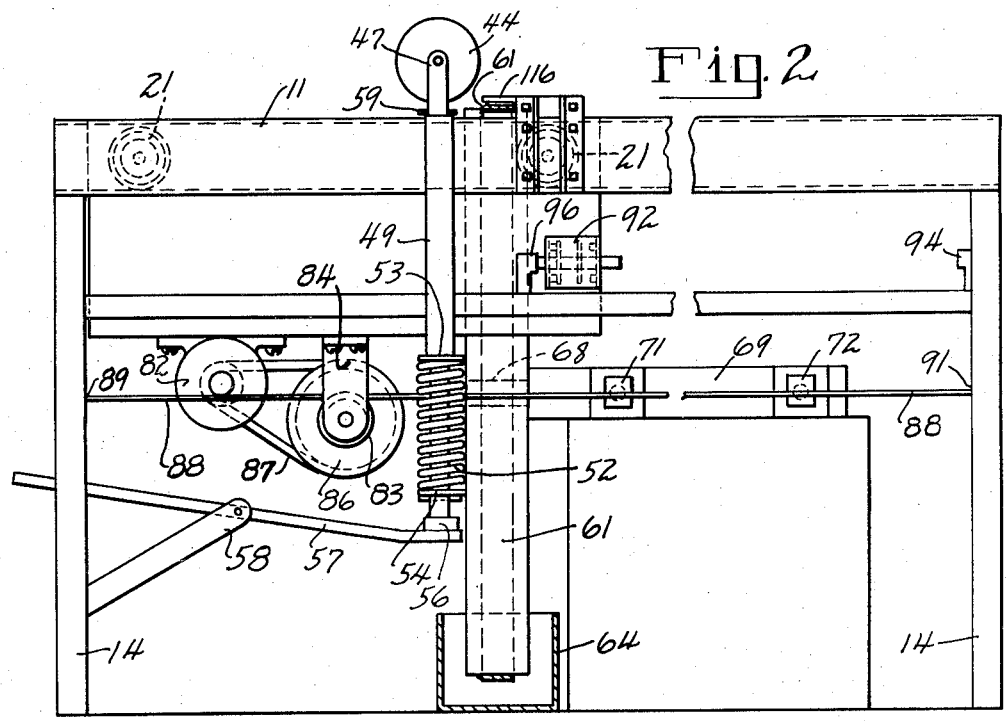
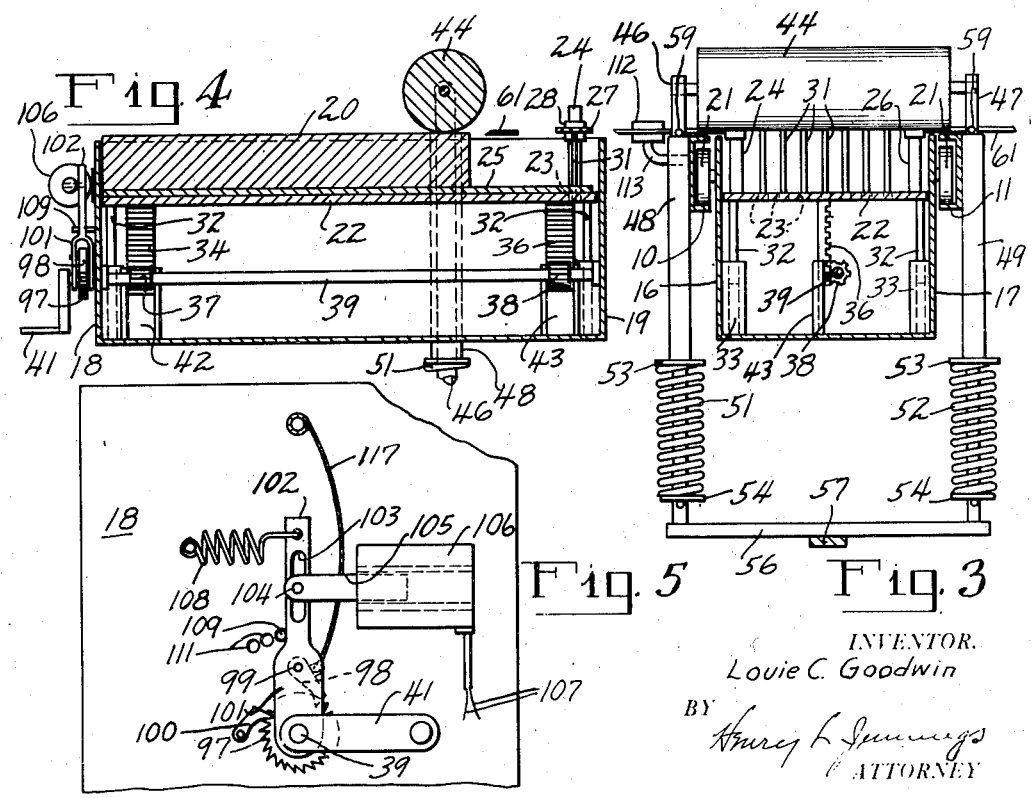
INVENTOR.
Louie C. Goodwin
BY
ATTORNEY Patented Mar. 1, 1949

2,463,099

UNITED STATES PATENT OFFICE 2,463,099

MEAT SLICING MACHINE

Louie C. Goodwin, Bessemer, Ala.

Application May 8, 1946, Serial No. 668,277

3 Claims. (Cl. 146—88)

This invention relates to a meat slicing machine and while not limited thereto, is particularly adapted for slicing blocks of fat into thin slices for sausage wrappings and has for an object the provision of apparatus of the character designated which shall embody a reciprocable meat holder, and a knife disposed in the path of the holder in position to engage and slice meat secured thereto.

A further object of my invention is to provide a meat slicer embodying a movable slicing knife and means to maintain the knife at an elevated temperature to adapt it for cutting fat meat.

Another object of my invention is to provide a meat slicing machine embodying a reciprocable meat holder, a knife positioned to be moved across and through the meat to slice it as the holder is reciprocated, and variable means to raise the meat holder a predetermined distance at each reciprocation thereof, whereby to form slices of uniform thickness.

As is well known in the art to which my invention relates, it is quite difficult to slice fat meat, particularly fat pork, but the slicing is much easier if the knife be maintained hot. It is accordingly a particular object of my invention to provide a slicing machine with a band type knife, with the flights of the knife disposed to run horizontally, and with one flight disposed to run in a bath of hot water.

Briefly, my improved machine embodies a main frame having guides in which a carriage is mounted to reciprocate. Mounted on the carriage is a meat holder, to reciprocate therewith, and spanning the holder is a hold-down roller which is carried by the frame and is springbiased to bear downwardly upon a block of meat mounted on the holder. A band type knife is mounted, with its flights running horizontally, and with the upper flight spanning the meat holder in position to engage a block of meat thereon and slice it as the holder is reciprocated. The lower flight of the knife is immersed in a pan through which hot water is circulated. A motor is provided for driving the carriage which reverses the motion thereof at each traverse of the carriage. Means are also provided for raising the holder on the carriage at the end of the return stroke of the carriage, after slicing, whereby to provide for slices of uniform thickness.

Apparatus embodying features of my invention is illustrated in the accompanying drawings, forming a part of this application, in which Fig. 1 is a plan view of the apparatus partly in section;

Fig. 2 is a sectional elevation looking in the direction of the arrows II—II of Fig. 1;

Fig. 3 is a sectional view taken along the line III—III of Fig. 1;

Fig. 4 is a sectional view taken along the line IV—IV of Fig. 1 and showing the carriage and hold-down roller removed from the frame of the machine, and with a block of meat thereon;

Fig. 5 is a detail view of the ratchet and pawl mechanism employed for raising the meat holder; and Fig. 6 is a wiring diagram illustrating the electrical circuits employed.

Referring to the drawings for a better understanding of my invention, my improved machine embodies a main frame having longitudinal extending frame members 10 and 11 in the form of channels with their webs turned inwardly to form guides and joined at their end by means of other frame members 12 and 13. The rectangular frame thus formed is supported by legs 14 mounted at the corners thereof.

Mounted within the frame is a rectangular box-like carriage having sides 16 and 17 and ends 18 and 19. See Figs. 3 and 4. The carriage thus formed is supported at its corners by means of rollers 21 which are mounted to run in the channels 10 and 11 as guides.

Fitting within the carriage is a vertically movable meat holder comprising a plate 22 having a series of holes 23 across one end thereof. At the ends of the series of holes are guide pins 24 and 26 and a hold-down bar 27 is provided with sleeves 28 and 29 at the end thereof which fit over the pins 24 and 26. The holder bar 27 is provided with a plurality of pins 31 which are disposed to enter the holes 23 in the plate 22. In operation, a block of meat 20 to be sliced is mounted on the plate 22 and is so cut as to provide a protruding rind or skin 25 along one edge thereof through which the pins 31 are driven into the holes 23, thereby anchoring the block of meat onto the plate 22. On the under side of the plate 22 are guide pins 32 which fit into sleeves 33 carried by the sides 16 and 17 of the carriage. The meat holder is supported and actuated vertically by means of a pair of racks 34 and 36 which are carried by the plate and which mesh, respectively, with pinions 37 and 38 mounted on a shaft 39 extending through the end wall 18 of the carriage and provided with a crank 41 on its outer end for manual operation. Automatic operation of the rack and pinion mechanism will be described later. The lower ends of the racks 34 and 36 travel in guides 42 and 43.

The block of meat 20 is held down on the plate 22 by means of a hold-down roller 44 which spans the carriage and the meat holder. The hold-down roller is journalled at its ends in bars 47 and 46 which extend downwardly through guides 48 and 49 mounted on the side frame members 10 and 11. At the lower ends of the bars 46 and 47, respectively, are springs 51 and 52 each of which surrounds one of the bars and bears at its upper end against a collar 53 on its associated guide. The lower ends of the springs bear against collars 54 whereby the bars 46 and 47 with the hold-down roller 44 are spring-biased downwardly. The lower ends of the bars 46 and 47 are cross connected by means of a bar 56. A lever 57 for manually raising the hold-down roller 44 is pivoted to a bracket 58 carried by the legs 14 of the frame at one end thereof. The inner end of the lever 57 is connected to the cross bar 56 and the outer end extends outwardly from the frame as shown in Fig. 2 where it may be actuated manually to raise the roller 44. Pins 59 extend through the upper ends of the bars 46 and 47 to limit their downward movement.

The block of meat 20 is sliced by means of a band type knife 61 mounted on pulleys 62 and 63 for its flights to run horizontally, its upper flight being disposed, as shown in Fig. 4 of the drawing, to engage the block of meat 20 on the meat holder and slice it as the holder is reciprocated. Disposed beneath the pulleys 62 and 63 is a tank 64 for hot water in which the lower flight of the knife is immersed throughout its length. Hot water may be circulated through the tank 64 by means of pipes 66 and 67, whereby to maintain its temperature elevated at all times. The shaft 68 of the pulley 62 is mounted in a bearing block 69, the position of which is adjustable by means of set screws 71 and 72 to take up lost motion in the knife 61. The shaft 73 of the pulley 63 is mounted in bearings 74 and 76 on opposite sides of the pulley 63 and serves as a drive shaft for the knife. The knife is driven by means of a motor 77 having a pulley 78. A belt 79 is trained about the pulley 78 and a second pulley 81 mounted on the shaft 73.

The carriage is reciprocated by means of a motor 82 supported from the under side of the carriage. A drum 83 mounted in brackets 84 on the under side of the carriage is driven by means of a pulley 86 and belt 87 from the motor 82. The drum 83 has wound thereon a cable 88, the ends of which are secured to the frame at 89 and 91 and which, by its rotation, winds the cable on the drum 83 and pulls the carriage along. The motor 82 is a reversing motor and the circuits therefor are controlled by a double throw reversing switch 92 mounted on the carriage to travel therewith and which has an operating member 93 protruding from the sides thereof in position to engage suitable abutments 94 and 96 at opposite ends of the travel of the carriage. This causes the motor 82 to reverse its direction of rotation and thus to reverse the direction of movement of the carriage at the end of each traverse.

The meat holder is raised at each reciprocation of the carriage by means of a ratchet 97 mounted on the end of the pinion shaft 39 which is engaged by a pawl 98 pivotally mounted at 99 in a holder 101 which holder is also pivoted at its lower end on the shaft 39. A fixed pawl 100 sustains the load between movements of the holder 101. The holder 101 extends upwardly to provide an operating arm 102 having a slot 103 therein and is connected by means of a pin 104 passing through the slot to the core 105 of an electric solenoid 106. The winding for the solenoid is provided with a circuit 107 which, as may be seen in Fig. 6 of the drawing, is closed when the motor 82 is moving the carriage in a direction for the block of meat 20 to be engaged by the knife 61. This causes the block of meat to be raised just prior to beginning the slicing stroke of the carriage. On the return movement, the solenoid circuit is not energized. The operating arm of the pawl holder 101 is biased outwardly by means of a spring 108 against a stop pin 109. The end 18 of the carriage is provided with a plurality of holes 111 in which the stop pin 109 may be positioned, whereby the operating stroke of the pawl holder may be varied, thereby varying the distance the meat holder is raised and providing means for varying the thickness of the meat slices.

From the foregoing description the operation of my improved meat slicing machine will be readily understood. The block of meat 20 is mounted on the meat holder plate 22 as shown in Fig. 4 of the drawing with the pins 31 of the holder bar 27 passing through the protruding rind 25 to hold the block in place. When placing the block of meat on the holder, the hold-down roller 44 is raised by bearing down on the outer end of the lever 57 and overcoming the force exerted by the springs 51 and 52. The carriage with the block of meat thereon is reciprocated by means of the reversible motor 82, the cable 88, and the cable drum 83. As the carriage is reciprocated, it moves under the hold-down roller 44 with the latter bearing downwardly on the block of meat 20 just in advance of the knife 61, as shown in Fig. 4. As the block of meat 20 is pushed against the edge of the knife 61, the latter is restrained from backward movement by means of a guide roller 112 mounted on a suitable bracket 113 secured to the frame member 10 in position to bear against the back or non-cutting edge of the blade. The blade 61 also passes through slotted guides 114 and 116 mounted on the sides of the frame which restrain it against upward and backward movement upon engagement with the block of meat 20. The thickness of the slices of meat may be varied, as already described, by varying the operating movement of the pawl holder 101. Upon the return stroke of the carriage, the limit of movement is reached as shown in Figs. 1, 2 and 4 of the drawing before the knife 61 reaches the holding bar 27. I have found with my improved machine that meat may be rapidly and accurately sliced with the exertion of a minimum of power. This improved result is contributed to greatly by the heated knife blade.

When it is desired to lower the holder, the pawl 98 is disengaged from the ratchet by means of the flexible member 117, while pawl 100 may be disengaged by rotating it about its pivot point.

From the foregoing it will be apparent that I have devised an improved meat slicing machine which is simple and sturdy of construction, and reliable in operation and one which is especially adapted to slice fat meat for sausage wrappings.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a meat slicing machine, a main frame, a carriage mounted to reciprocate in the frame, a meat holder mounted on the carriage including means to secure and hold a block of meat to be sliced, a band type knife with horizontal flights, the upper flight being disposed in the path of the block of meat to slice it as it is reciprocated, a reversing electric motor for driving the carriage, a switch for the motor, means to actuate the switch at each end of the travel of the carriage, ratchet and pawl mechanism for raising the meat holder, an electric solenoid for actuating said mechanism, a circuit for the solenoid, and means to energize said circuit at the beginning of the slicing movement of the meat holder.

2. In a meat slicing machine, a frame, guides in the sides of the frame, a reciprocable carriage mounted on the frame and having rollers thereon disposed in the guides, a meat holder mounted on the carriage, a power driven band type knife with its flights disposed horizontally and its upper flight extending across the meat holder in the path of a block of meat thereon, spring biased hold-down roller mounted on the frame and spanning the carriage to bear against the block of meat directly in advance of the edge of the knife, a pan disposed for the lower flight of the knife to run therein, and means to circulate hot water through the pan.

3. In a meat slicing machine, a frame, guides in the sides of the frame, a reciprocable carriage mounted on the frame and having rollers thereon disposed in the guides, a meat holder mounted on the carriage, a power driven band type knife with its flights disposed horizontally and its upper flight extending across the meat holder in the path of a block of meat thereon, a spring biased hold-down roller mounted on the frame and spanning the carriage to bear against the block of meat directly in adance of the edge of the knife, and a pan disposed for the lower flight of the knife to run therein, means to circulate hot water through the pan, and means to raise the hold-down roller to clear the meat holder.

LOUIE C. GOODWIN.

REFERENCES CITED

The following references are of record in the file of this patent:

UNITED STATES PATENTS

| Number | Name | Date |
|---|---|---|
| 358,323 | Ballew | Feb. 22, 1887 |
| 638,238 | Haley | Dec. 5, 1899 |
| 1,129,360 | Niebling | Feb. 23, 1915 |
| 1,384,732 | Schermer | July 12, 1921 |
| 1,495,590 | Hogelucht | May 27, 1924 |
| 1,544,339 | Oderman | June 30, 1925 |
| 1,590,708 | Swanson | June 29, 1926 |
| 1,663,543 | Buck | Mar. 27, 1928 |
| 1,665,888 | Litty | Apr. 10, 1928 |
| 1,703,217 | Watson | Feb. 26, 1929 |
| 1,759,478 | Bergstrom | May 20, 1930 |
| 1,811,186 | Rankin | June 23, 1931 |

FOREIGN PATENTS

| Number | Country | Date |
|---|---|---|
| 500,457 | Great Britain | Feb. 9, 1939 |